United States Patent [19]

Yamaguchi et al.

[11] 4,280,455
[45] Jul. 28, 1981

[54] INTERNAL COMBUSTION ENGINE

[75] Inventors: Hiroshi Yamaguchi, Ohmiya; Hiroaki Kaneko, Ageo; Toshihiro Nagano, Tokyo, all of Japan

[73] Assignee: Fuji Jukogyo Kabushiki Kaisha, Tokyo, Japan

[21] Appl. No.: 4,133

[22] Filed: Jan. 17, 1979

[30] Foreign Application Priority Data

Jan. 30, 1978 [JP] Japan .................. 53/9008
Jan. 30, 1978 [JP] Japan .................. 53/9009
Jan. 30, 1978 [JP] Japan .................. 53/9010
Jan. 30, 1978 [JP] Japan ............... 53/9813[U]

[51] Int. Cl.³ .............................. F01M 1/00
[52] U.S. Cl. ..................... 123/196 M; 123/41.39; 184/6.8
[58] Field of Search .......... 123/193 P, 196 M, 196 V, 123/196 R, 41.35, 41.36, 41.39; 92/158, 159, 162; 308/5 R; 184/6.8, 6.5

[56] References Cited

U.S. PATENT DOCUMENTS

| 1,460,537 | 7/1923 | Dewar | 92/158 |
| 1,468,819 | 9/1923 | Knudsen | 123/41.39 |
| 1,689,752 | 10/1928 | Rushmore | 184/6.8 |
| 1,694,518 | 12/1928 | Rushmore | 184/6.8 |
| 2,118,283 | 5/1938 | Winslow | 184/6.8 |
| 2,359,672 | 10/1944 | Penco | 123/41.39 |
| 2,911,963 | 11/1959 | Goldsmith | 123/41.39 |
| 4,048,975 | 9/1977 | Urquhart | 123/193 P |

FOREIGN PATENT DOCUMENTS

| 583201 | 9/1959 | Canada | 184/6.8 |
| 833880 | 3/1952 | Fed. Rep. of Germany | 184/6.8 |
| 2434902 | 6/1975 | Fed. Rep. of Germany | 123/41.39 |
| 6617518 | 12/1966 | Netherlands | 92/158 |
| 578467 | 6/1946 | United Kingdom | 92/158 |
| 752329 | 7/1956 | United Kingdom | 92/158 |

OTHER PUBLICATIONS

Automotive Industries, 10/3/36.

Primary Examiner—Ronald H. Lazarus
Attorney, Agent, or Firm—Martin A. Farber

[57] ABSTRACT

An internal combustion engine comprises a cylinder, a piston reciprocating in the cylinder, piston rings arranged on the periphery of the piston, and at least a pair of oil ports symmetrically provided in a wall member of the cylinder. The oil ports communicate with the space between the wall member and the piston and are positioned to open onto the portion below the lowermost piston ring during the reciprocation of the piston. A system supplies a portion of the lubricating oil for the internal combustion engine under pressure to this space through the oil ports, and conduits communicate the oil ports with the supply system.

10 Claims, 13 Drawing Figures

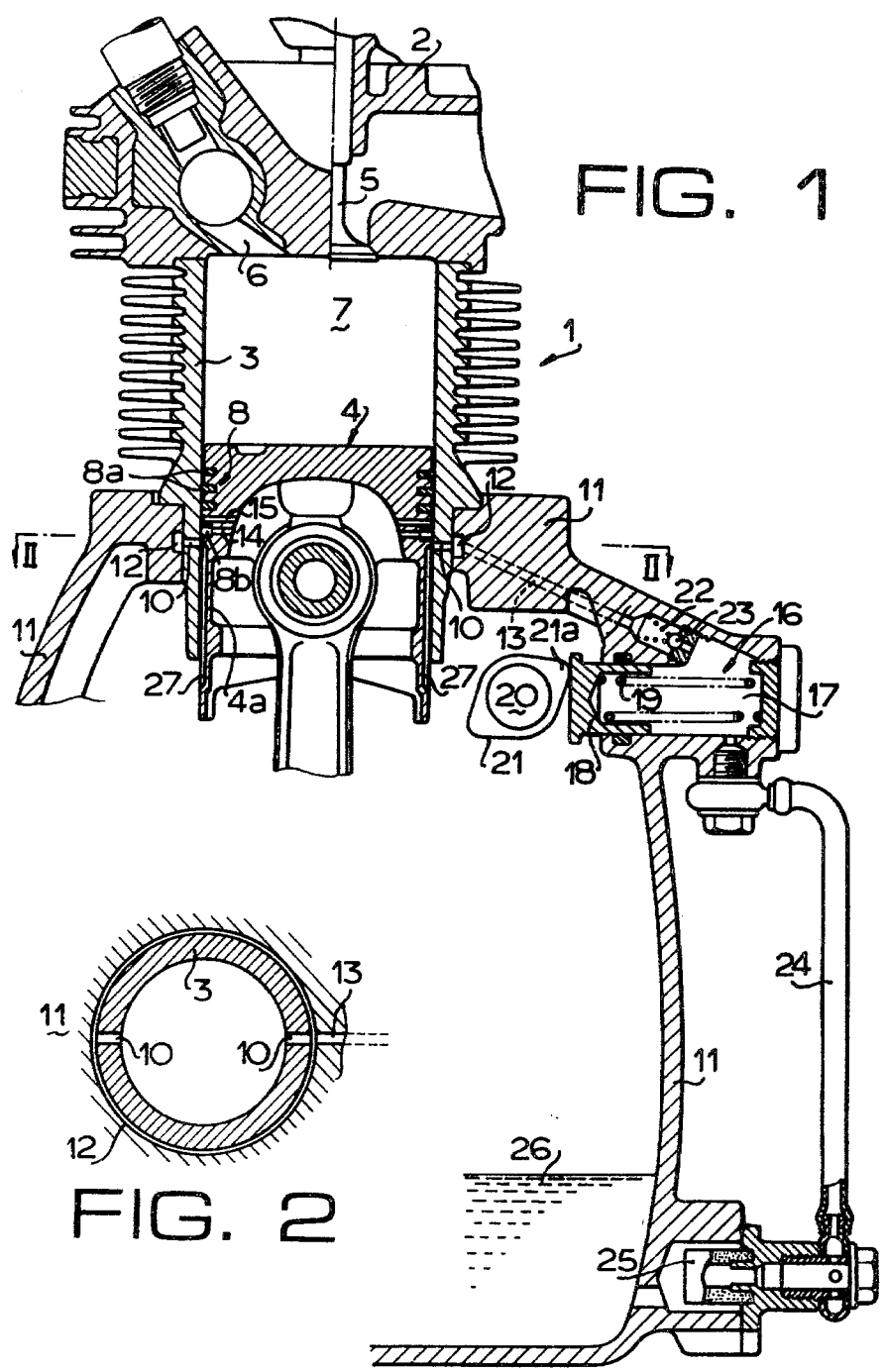

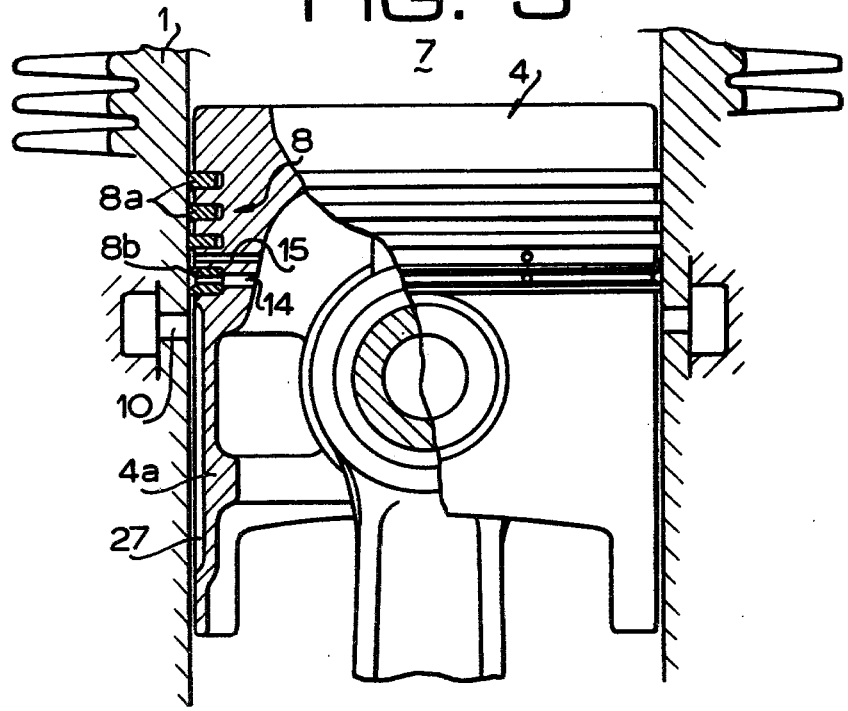
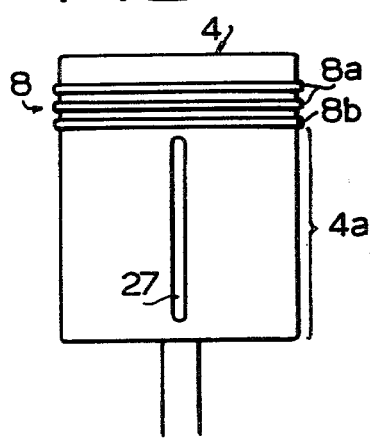
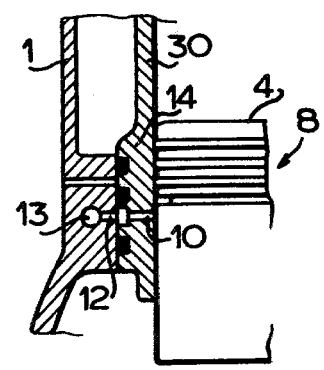

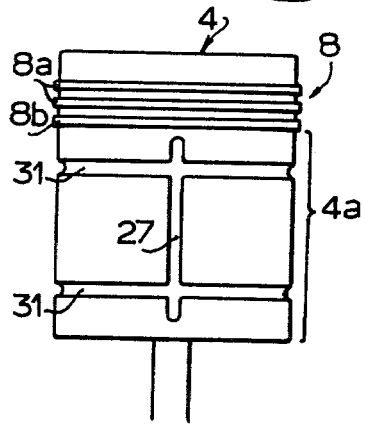
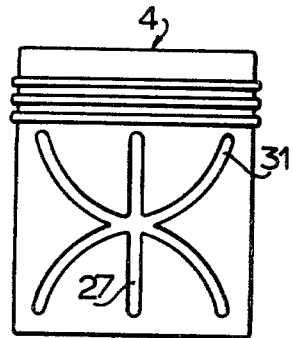
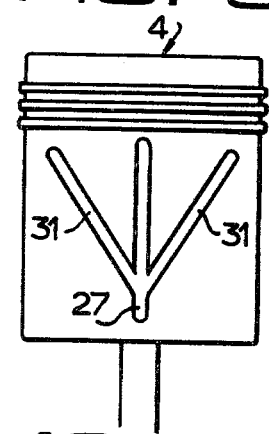
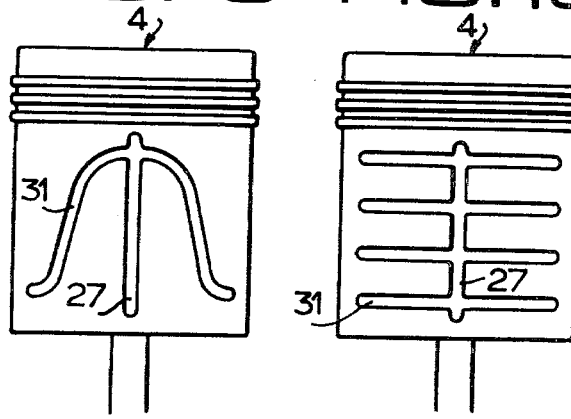
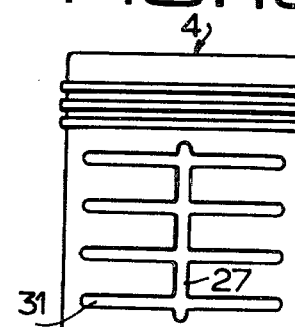
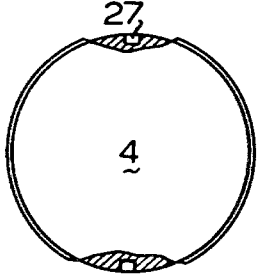
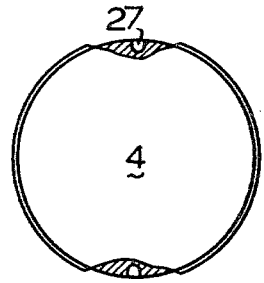
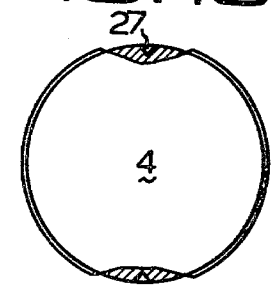

INTERNAL COMBUSTION ENGINE

BACKGROUND OF THE INVENTION

The present invention relates to the improvement of an internal combustion engine which is powered by converting the reciprocating motion of a piston to rotating motion.

In such type of an internal combustion engine with the reciprocating piston there is generally provided a predetermined piston clearance between the piston and the inner wall of the cylinder. Because thermal expansion of the piston, which is especially made of aluminum alloy, is greater than the cylinder, it is necessary to provide a large piston clearance. Therefore, the piston swings about the piston pin within the piston clearance when the moving direction of the piston is reversed at the stroke ends. This means that the periphery of the piston strikes the inner wall of the cylinder to make a slapping noise.

SUMMARY OF THE INVENTION

An object of the present invention is to provide an improved reciprocating engine in which piston slapping may be prevented to abate the noise, and in which, wear of the piston and cylinder may be decreased, and which has the effect of cooling the piston.

According to the invention improved internal combustion engine comprises a cylinder, a piston reciprocating in the cylinder, piston rings arranged on the periphery of the piston, and at least a pair of oil ports symmetrically provided in a wall member of the cylinder. The oil ports communicate with the space between the wall member and the piston and are positioned to open into the portion below the lowermost piston ring during the reciprocation of the piston when the piston is at the bottom dead center and positioned to open onto a lower end portion of the piston skirt when the piston is at the top dead center. A system supplies a portion of the lubricating oil for the internal combustion engine under pressure to this space through the oil ports, and conduits communicate the oil ports with the supply system.

In such an engine, the lubricating oil tends to enter the combustion chamber passing over the oil ring, because excessive oil is supplied under pressure. Therefore, it is a further object of the present invention to provide an improved internal combustion engine which may prevent the lubricating oil from entering into the combustion chamber and in which the returning of the excess oil is certainly effected to reduce the consumption of lubricating oil. To this end, an oil return hole passing through the piston is additionally provided between the oil ring and gas ring, whereby the lubricating oil which enters between the oil ring and the gas ring, without remaining therein, is sent back to the crank case.

Further features and advantages of the present invention will be apparent from the ensuing description of preferred embodiments given merely by way of example with reference to the accompanying drawings.

BRIEF DESCRIPTION OF THE DRAWINGS

FIG. 1 is a sectional view showing a main part of an internal combustion engine according to one embodiment of the present invention;

FIG. 2 is a sectional view taking along the line II—II of FIG. 1;

FIG. 3 is an enlarged sectional view showing a part of the engine;

FIG. 4 shows the piston of the engine;

FIG. 5 is a sectional view showing a part of another type of engine;

FIG. 6 shows a modification of the piston;

FIGS. 7 to 10 show various shapes of the oil spreading grooves;

FIGS. 11 to 13 show various sectional shapes of the groove.

DESCRIPTION OF THE PREFERRED EMBODIMENT

FIGS. 1 and 2 show an embodiment in which the present invention is applied to a diesel engine. In the drawings, there are cooperatively provided a cylinder block 1, a cylinder head 2, a cylinder 3, and a piston 4 slidably engaged in the cylinder 3. Formed in the upper portion of the cylinder 3 is a combustion chamber 7 provided with an intake or exhaust valve 5 and a fuel injection nozzle 6. Piston rings 8 comprising gas rings 8a and an oil ring 8b are engaged in annular grooves provided in the periphery of the piston 4, so that the piston 4 slidably reciprocates in the cylinder 3 keeping airtight engagement with the cylinder.

In accordance with the present invention, a pair of diametrically opposite oil ports 10 are provided in the cylinder 3. Each oil port is so arranged that the oil ports open upon the peripheral surface of the piston below the piston ring 8b during the reciprocation of the piston. The lubrication oil ports 10 communicate with an annular oil groove 12 which is provided on the crank case 11 at the portion joined to the cylinder block 1 and the oil groove 12 in turn communicates with the discharge port of an oil pump 16 through an oil passage 13 as shown in the dotted line in FIG. 1. The oil pump 16 consists of a plunger 18 slidably provided in a pump chamber 17 which is formed in the crank case 11 and a coil spring 19 set in the pump chamber 17 so as to urge the plunger 18 against a pump driving cam 21 provided on a cam shaft 20 which is rotated in synchronism with the crank shaft (not shown) of the engine. A check valve 23 loaded by a spring 22 is provided on each of the intake and discharge ports of the oil pump 16 respectively (the intake port check valve being not shown). The intake port of the oil pump 16 is communicated through an intake tube 24 and an oil strainer 25 to an oil tank 26 provided in the bottom of crank case 11. In the embodiment shown in the drawings although at least two oil ports 10 are provided in the peripheral wall portion of the cylinder 3, the number of the ports may be varied.

As shown in FIGS. 1 and 3, a first oil return hole 14 is provided at the bottom of the annular groove of the oil ring 8b communicating with the interior of the piston 4 and a second oil return hole 15 is provided between the oil ring 8b and the lowermost gas ring 8a communicating with the interior of the piston. The first and second oil return holes 14, 15 may be provided in the piston 4 circumferentially at one or more positions.

Further, as shown in FIGS. 3 and 4, there is provided a pair of oil guide grooves 27 on the periphery of the piston skirt 4a extending in the axial direction and communicating with the oil ports 10 respectively.

In operation, the plunger 18 is operated in reciprocal motion in the pump chamber 17 by the function of the coil spring 19 and protrusion 21a of the cam 21 to effect an oil pumping operation in synchronism with the crank shaft, so that lubricating oil is fed through the oil groove 13 and injected into the space (piston clearance) from the oil ports 10 when the piston 4 is in the bottom dead center. The lubricating oil which is injected into the clearance flows in the grooves 27 and overflows to spread in the piston clearance to form a relatively thick oil film. Therefore inclination caused by the change of direction of the piston motion can be limited.

While the piston moves toward the top dead center, lubricating oil is injected to the oil guide grooves 27 the same as when the piston is in the bottom dead center, and diffused over the relatively wide area.

Further, when the piston is in the top dead center, the injected oil forms a relatively thick high pressure oil film over a wide area of the piston clearance, as it does at the bottom dead center. Thus, inclination of the piston at the change of direction at the top dead center can be prevented to reduce the slapping sound of the piston 4.

The lubricating oil which is injected from the oil port 10 is prevented from directly entering into the combustion chamber, because each oil port 10 is arranged in the position outside of the sliding area of the piston rings 8.

Oil injected in the piston clearance is scratched off by the effect of oil ring 8b into the crank case 11 below, and oil entering into the groove of the oil ring 8b is returned back to the crank case through the first oil return hole 14. However, since the provision of the oil return hole 14 is not enough to scratch off a great deal of oil, it may still arise that a portion of oil may pass rising over the oil ring 8b and remain in the space between the wall of cylinder and the land formed between the oil ring 8b and the gas ring 8a. Therefore, this invention provides a second oil return hole 15 to send the oil in the space between the cylinder wall and the land rapidly back into the crank case 11 without remaining in the space and entering into the combustion chamber.

FIG. 5 shows a part of the cylinder 1 having a cylinder liner 30. In such an engine, the oil port 10 is provided in the liner 30 and the annular oil groove 12 is formed in the cylinder wall outside of the liner.

FIG. 6 shows a modification of piston 8. On the periphery of the piston, a pair of annular oil spreading grooves 31 are provided to communicate with the guide groove 27. In accordance with the grooves 31, lubricating oil may widely spread in the piston clearance. The number and direction, and the sectional shape of the oil spreading grooves 31 may be suitably selected. FIGS. 7 to 13 show different examples of the oil spreading grooves, although the invention is not limited thereto.

Thus, in accordance with the present invention, a portion of lubricating oil is injected into the space between the piston and the wall of the cylinder, whereby the swing of the piston at the change of direction positions can be prevented by the injected lubricating oil, thereby minimizing the noise caused by piston slapping. Further, because a great deal of lubricating oil is injected into the space between the piston and the wall of cylinder, advantages, such as minimum wear, improved durability as well as the high cooling efficiency of the members may be obtained.

While I have disclosed several embodiments of the invention it is to be understood that these embodiments are given by example only and not in a limiting sense.

What is claimed is:

1. An internal combustion engine comprising
    a cylinder comprising a hollow wall member having a periphery defining a chamber having a center,
    a piston reciprocatingly disposed in the periphery of said wall member of said cylinder in said chamber operatively between a top dead center and a bottom dead center of the piston and defining space between said piston and said wall member,
    piston rings disposed on a periphery of said piston,
    said wall member being formed with at least a pair of oil ports, said oil ports communicating symmetrically with said peripheries of said wall member and of said piston and being symmetrically arranged relative to said center of said chamber, said oil ports communicating with said space between said wall member and said piston and being positioned to open onto a portion of said piston below a lowermost of said piston rings when said piston is at the bottom dead center and positioned to open onto a lower end portion of the piston skirt when said piston is at the top dead center,
    means for supplying, during the reciprocation of said piston including during the top dead center and the bottom dead center of the piston, a portion of lubricating oil for the internal combustion engine under pressure to and through said oil ports to said space, said means including conduit means for communicating said oil ports with a portion of said means for supplying a portion of the lubricating oil.

2. An internal combustion engine comprising
    a cylinder comprising a hollow wall member having a periphery defining a chamber having a center,
    a piston reciprocatingly disposed in the periphery of said wall member of said cylinder in said chamber operatively between a top dead center and a bottom dead center of the piston and defining space between said piston and said wall member,
    piston rings disposed on a periphery of said piston,
    said wall member being formed with at least a pair of oil ports, said oil ports communicating symmetrically with said peripheries of said wall member and of said piston and being symmetrically arranged relative to said center of said chamber, said oil ports communicating with said space between said wall member and said piston and being positioned to open onto a portion of said piston below a lowermost of said piston rings when said piston is at the bottom dead center and positioned to open onto a lower end portion of the piston skirt when said piston is at the top dead center,
    means for supplying, during the reciprocation of said piston including during the top dead center and the bottom dead center of the piston, a portion of lubricating oil for the internal combustion engine under pressure to and through said oil ports to said space, said means including conduit means for communicating said oil ports with a portion of said means for supplying a portion of the lubricating oil,
    the periphery of said piston is formed with oil grooves communicating with said oil ports.

3. The internal combustion engine according to claim 2, wherein
    each of said oil grooves is arranged along an axial direction of the piston.

4. The internal combustion engine according to claim 3, wherein
    each of said oil grooves is disposed relative to said oil ports in communication with each of said oil ports respectively during reciprocation of said piston.

5. An internal combustion engine comprising
a cylinder comprising a hollow wall member having a periphery defining a chamber having a center,
a piston reciprocatingly disposed in the periphery of said wall member of said cylinder in said chamber operatively between a top dead center and a bottom dead center of the piston and defining space between said piston and said wall member,
piston rings disposed on a periphery of said piston,
said wall member being formed with at least a pair of oil ports, said oil ports communicating symmetrically with said peripheries of said wall member and of said piston and being symmetrically arranged relative to said center of said chamber, said oil ports communicating with said space between said wall member and said piston and being positioned to open onto a portion of said piston below a lowermost of said piston rings when said piston is at the bottom dead center and positioned to open onto a lower end portion of the piston skirt when said piston is at the top dead center,
means for supplying, during the reciprocation of said piston including during the top dead center and the bottom dead center of the piston, a portion of lubricating oil for the internal combustion engine under pressure to and through said oil ports to said space, said means including conduit means for communicating said oil ports with a portion of said means for supplying a portion of the lubricating oil,
a crank case of the engine,
said supplying means includes an oil storage chamber formed in said crank case,
said piston is formed with an interior space communicating with said oil storage chamber located therebelow, said piston is formed with oil return holes disposed between said rings and extending from the periphery of said piston communicating said space with said interior space of said piston for returning the oil to said crank case of said engine.

6. The internal combustion engine according to claims 1 or 2, further comprising
a crank case surrounds at least a portion of said wall member and is formed with an annular oil groove communicating with said oil ports and with said conduit means.

7. An internal combustion engine according to claim 1 in which said means for supplying a portion of the lubricating oil includes a pump operated in synchronism with a crank shaft of the engine.

8. An internal combustion engine according to claim 1 in which said oil ports comprise at least a pair of diametrically opposed ports.

9. The internal combustion engine according to claims 1, 2, or 5, further comprising
annular oil groove means cooperating with said wall member communicating with said oil ports at outer openings thereof.

10. The internal combustion engine according to claim 2, further comprising
a cam shaft of the engine operatively connected to the crank shaft,
a cam mounted on said cam shaft and formed with two protrusions,
said pump is a plunger pump,
said plunger pump operatively engages said two protrusions of said cam, respectively.

* * * * *